Figure 1:
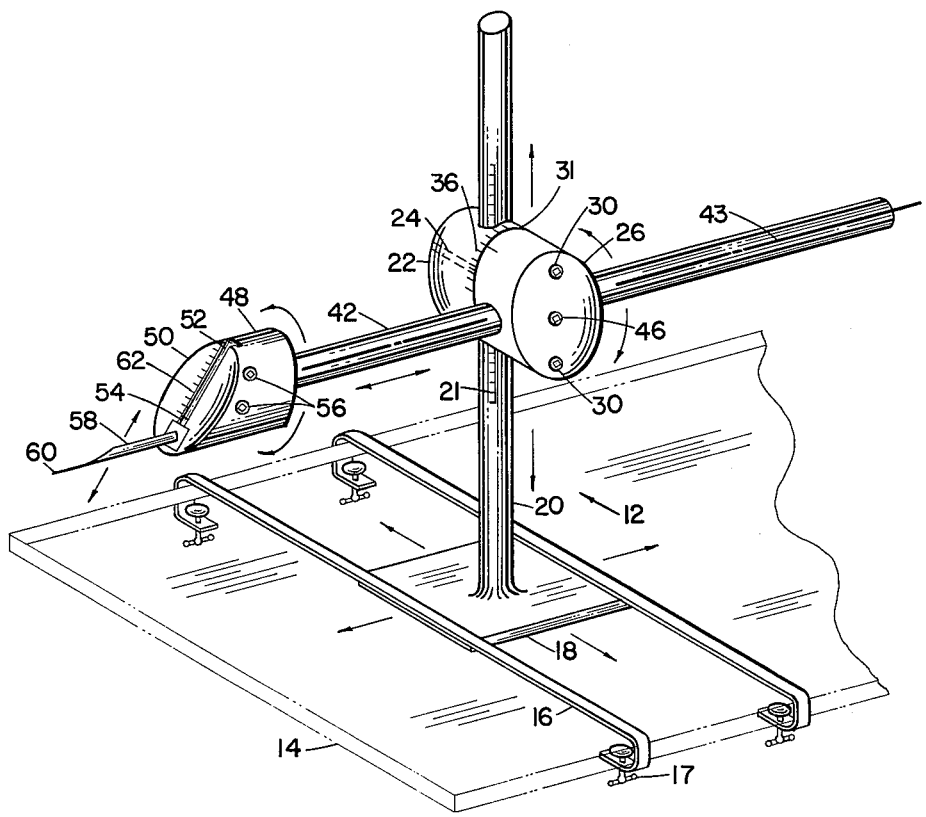

Aug. 13, 1963  R. K. CANNON  3,100,346
SCRIBE

Filed March 4, 1959  2 Sheets-Sheet 1

Robert K. Cannon,
*INVENTOR.*

BY S. J. Rotondi,
A. P. Dupont,
H. M. Snyder and
H. P. Murphy.
ATTORNEYS.

Aug. 13, 1963 R. K. CANNON 3,100,346
SCRIBE

Filed March 4, 1959 2 Sheets-Sheet 2

Robert K. Cannon,
INVENTOR.

BY
ATTORNEYS.

United States Patent Office 3,100,346
Patented Aug. 13, 1963

3,100,346
SCRIBE
Robert K. Cannon, 2115 Sycamore St. SW.,
Huntsville, Ala.
Filed Mar. 4, 1959, Ser. No. 797,315
1 Claim. (Cl. 33—21)
(Granted under Title 35, U.S. Code (1952), sec. 266)

The invention described herein may be manufactured and used by or for the Government for governmental purposes without the payment of any royalty thereon.

My invention relates to scribes and more particularly to such devices for describing cylindrical traces in warped surfaces.

Conventionally, when a tube is required to pierce a specimen having a warped surface, a tube with a similar diameter is cut for coincidence with the warped surface and a trace of the matched engagement is disposed thereon by scribing around the similar tube. The coincidence is obtained by time-consuming, tedious, cut and try methods and the product only approximately matches the surface to result in wasted material and inadequate fittings.

It is, therefore, an object of my invention to provide a device which describes an accurate trace of the intersection on any surface of an intersecting cylindrical body therewith.

Other aims and objects of my invention will appear from the following explanation thereof.

My invention comprises a scribe which includes a style, a base, and members including a rod secured therebetween to generate with the scribe a simulated cylindrical body about the axis of the rod, the rod axis being in angular relation with a base plane. The scribe is disposed to trace on any surface the intersection of the body with the surface. The base is guided by a pair of tracks secured to a table defining the base plane. A column is afixed at right angles to the base and a support with a circular slot is axised in the column for rotation therearound and disposed to slide axially thereon. A mount is connected to the support by T-bolts engaging the slot to define an axis parallel to the base for rotation of the rod axis. The rod is axially slidable in the mount. The column and the support are rigidly secured by a set screw and the T-bolts tighten to secure the angular relation.

A usually cylindrical head is secured to the rod and includes a face positioned obliquely to the axis. The face is provided with a recess along the major diameter thereof and a slide is secured therein by set-screws disposed in the head. The style projects from the slide and includes a rounded knife-edge tip for marking.

Thus, the simulated body is generated by rotation of the style about the axis of the rod and the axial motion thereof within the mount. The diameter of the simulated body is determined by the position of the slide in the recess. The angle between the axis and the base plane is determined by rotation of the mount on the support. The column may be positioned at any point on the base plane by the location of the base on the table.

Figure 2:
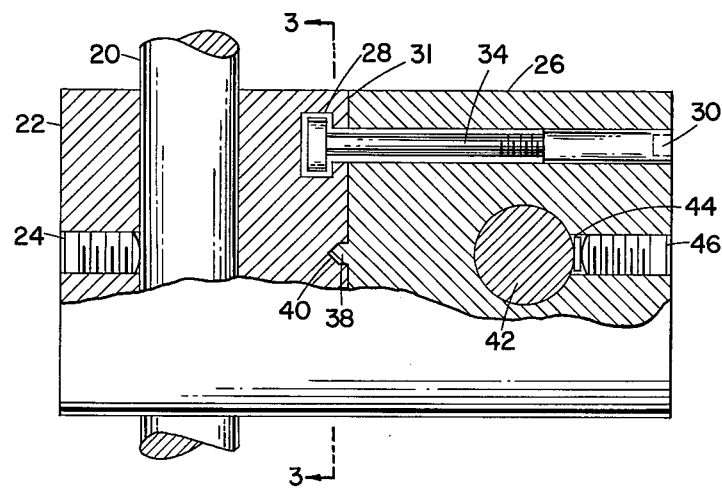

For a more complete understanding of my invention, reference is made to the following explanation and accompanying drawings, in which:

FIGURE 1 is an isometric view of the scribe;
FIGURE 2 is an elevation section of the support and mount; and
FIGURE 3 is a view along line 3—3 of FIGURE 2.

Accordingly, in FIGURE 1 a scribe 12 is provided with a base 18 and a column 20 secured thereto and the base is disposed for engagement with a base plane 14 by tracks 16 and anchor bolts 17 for normal relation of column 20 with the base plane. A support 22 is disposed on the column for rotation therearound and axial movement therealong and provided with set screw 24 for attachment at a particular point thereon.

Figure 3:
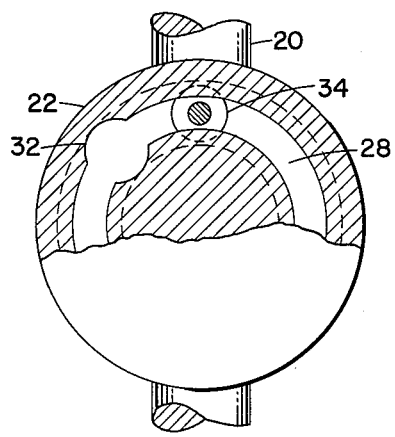

A mount 26 is attached to the support by means of a circular T-slot 28 therein and T-bolts 34 in engagement with the slot (see FIGURES 2 and 3). The mount rotates about a stud 38 engaging a hole 40 in support 22. A face 31 of support 22 contacts the mount and the T-bolts have heads squared to slide within the T-slot. A hole 32 permits access of the heads to T-slot 28. Nuts 30 are threaded on the T-bolts to secure the support and the mount as a unit.

Rod 42 with an axis 43 (FIGURE 1) in parallel relation with face 31 slides axially and rotates within mount 26. A spring 44 and a bolt 46 exert pressure against the rod to prevent wobble thereof. The height of the axis from the base plane is indicated by graduations 21 on the column. The angle of the rod with the base plane is indicated by graduations 36 on the support. A head 48 is attached to one end of rod 42. The free end of the head is cut obliquely to axis 43 to form an elliptical face 50.

A recess 52 lies within the face along the major diameter thereof. Slide 54 engages the recess and is secured therein by set-screws 56. Style 58 is permanently set in the slide and has a rounded knife-edge tip 60 for scribing a trace on a surface. The angularity of face 50 provides a longer travel of slide 54 than of style 58 for more accurate setting of the radius between the style and axis 43. Graduations 62 on face 50 indicate the displacement of tip 60 from axis 43.

Operationally, when a cylindrical body is to intersect a specimen with a warped surface, axis 43 is set coincidentally with the axis of the cylindrical body by adjustment between the support and the column for elevation and between the mount and the support at an angle indicated by graduations 36. Tip 60 is displaced by slide 54 from axis 43 a distance equal to the radius of the cylindrical body. For generation of a similar cylindrical body, since rod 42 is axially slidable in mount 26, the tip scribes the required trace on the warped surface.

While the foregoing is a description of the preferred embodiment, the following claim is intended to include those modifications and variations that are within the spirit and scope of my invention.

I claim:

A scribe comprising in combination:
(a) a straight circular column;
(b) a base perpendicularly secured to one end of said column;
(c) a cylindrical support mounted on said column and being axially and rotatably adjustable with respect to said column;
(d) a cylindrical mount having the same outer diameter as said support and having one end rotatably adjustable upon and coaxially secured to one end of said support the longitudinal axis of said support being normal to the longitudinal axis of said column;
(e) a circular rod carried by said mount and extending therethrough and having a longitudinal axis perpendicular to the longitudinal axis of said mount;
(f) said rod being rotatably and axially adjustable with respect to said mount;
(g) a cylindrical head rigidly secured over one end of said rod;
(h) a style slidably engaged with said head so that the longitudinal axis of said style and said rod maintain a parallel relationship with respect to each other when said rod is rotated about its longitudinal axis;
(i) said support having a cylindrical opening extending therethrough for engagement with said column;
(j) a set screw extending from the other end of said support to said column to provide adjustable locking engagement with said column;
(k) said mount having a pair of openings parallel to the longitudinal axis of said mount and radially displaced therefrom;
(l) a circular T-slot radially disposed about said one-end of said support;
(m) a pair of T-bolts mounted within said pair of openings and adapted for engagement with said circular T-slot of said support for securing said support to said mount;
(n) a bolt and spring extending from the other end of said mount to said rod to provide adjustable locking engagement with said rod;
(o) said head having its outer face inclined at an acute angle with respect to the longitudinal axis of said rod;
(p) said outer face having a recess extending along its major diameter; and
(q) a slide secured to said style and disposed for slidable engagement within said recess.

References Cited in the file of this patent

UNITED STATES PATENTS

| | | |
|---|---|---|
| 352,584 | Stafford et al. | Nov. 16, 1886 |
| 512,653 | Kling | Jan. 9, 1894 |
| 677,590 | Oldfied | July 2, 1901 |
| 1,149,469 | Schilling | Aug. 10, 1915 |
| 1,252,031 | Robinson | Jan. 1, 1918 |
| 1,341,646 | Jesnig | June 1, 1920 |
| 1,743,024 | Clark | Jan. 7, 1930 |
| 2,494,698 | Forrest | Jan. 17, 1950 |
| 2,594,457 | Kunzler | Apr. 29, 1952 |
| 2,664,639 | Denny | Jan. 5, 1954 |

FOREIGN PATENTS

| | | |
|---|---|---|
| 175,894 | Germany | Oct. 12, 1906 |
| 137,426 | Sweden | Sept. 23, 1952 |

OTHER REFERENCES

Publication from "American Machinist"; "One Certain Surface Gage," Apr. 17, 1930, pages 653–654.